March 28, 1944.  A. C. PETERSON  2,345,286
COIN CONTROLLED PRINTING MEANS
Filed March 7, 1940  2 Sheets-Sheet 1
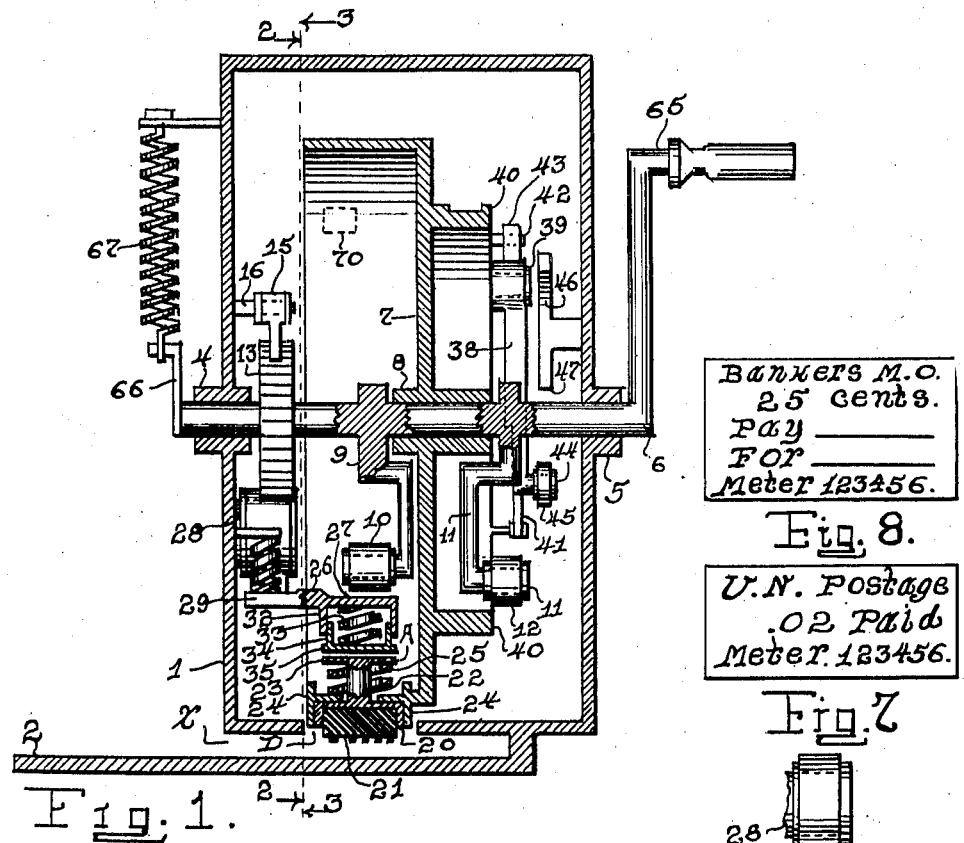
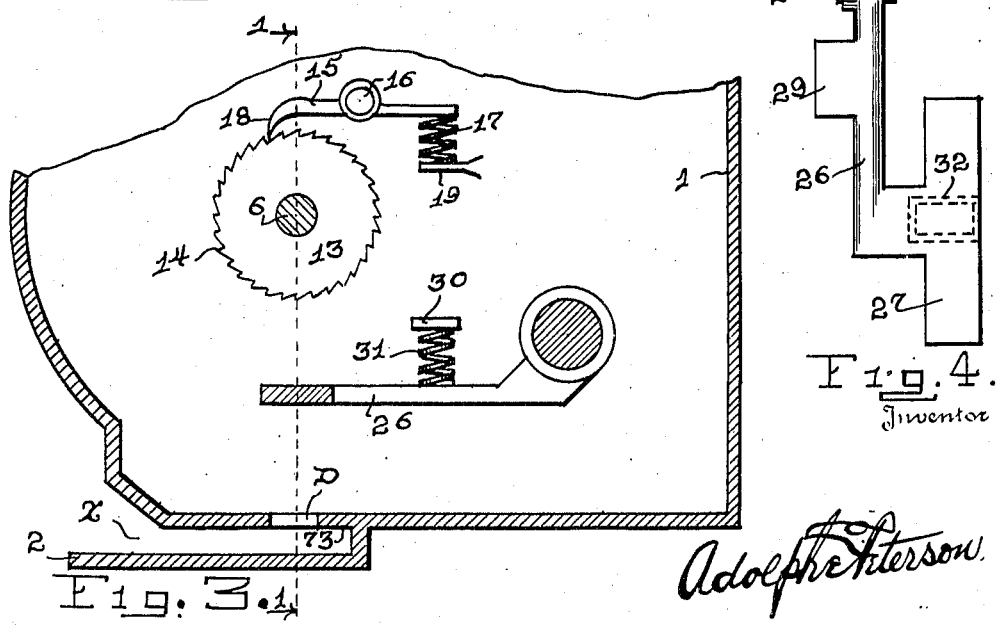

March 28, 1944. A. C. PETERSON 2,345,286
COIN CONTROLLED PRINTING MEANS
Filed March 7, 1940 2 Sheets-Sheet 2

Inventor
Adolph C. Peterson.

Patented Mar. 28, 1944

2,345,286

UNITED STATES PATENT OFFICE 2,345,286

COIN CONTROLLED PRINTING MEANS

Adolphe C. Peterson, Minneapolis, Minn.

Application March 7, 1940, Serial No. 322,789

14 Claims. (Cl. 194—1)

My invention relates to means especially adapted for affixing a certificate or stamped inscription such as may indicate postage payment or money payment, and is therefore called "Coin controlled printing means."

The principal objects of my invention are to provide an improved means for imposing or placing an inscription on an item such as an envelope or paper sheet in return for a money payment made particularly for such inscription or stamping, and to provide such a means in a form which is readily and cheaply made, readily adaptable for such purposes, and so organized and limited that it will perform the functions indicated in an acceptable manner, and with the proper limitations upon its functioning.

A chief object in this device is to provide a device which will permit of such use automatically at a customer's wish without entailing liability for unauthorized use or duplication of functioning without duplication of payment therefor, in other words permitting of its use without subjecting the owner or provider of the service to liability of loss through thieving or incapacity of the device.

A chief object is to provide such a means which may be of such compact and efficient form and size for its functioning, that it may readily be used in any store or place almost without limitation, and that it will provide the service demanded in a form which is readily utilizable by a customer and readily observable in its service or use.

The especial uses of this device are for selling or providing a postage paid inscription automatically on payment of a specified fee therefor, and to provide a certificate of payment as for a small money order or bank money order on payment of a fee or money for the inscription, and to provide such services by machine utilizable by a customer without clerical supervision or service. In connection with the use for postage payment certification and vending thereof, an object is to provide such a device which automatically will provide such certification in any one of a limited number of amounts, such as one, two or three, cents, on payment of the like specified amount into the machine, by a customer; or which will similarly in connection with its use as a money order or bank order vendor, provide such certification in any one of a limited number of amounts, such as one, two, or three cents, or five, ten or fifteen cents, or say twenty-five, fifty, and seventy-five, or say one, two or three, dollars, as may be thought applicable for any particular service or machine use, on payment of the specified amount whatever that may be into the machine, by a customer.

An object is especially to provide such a device which is automatically in its use, locked against repetition of certification for the same money insertion, that is which inherently provides against duplication of the certification function, without particular payment for the particular certification, so as to insure against thieving from the machine of such certifications, or loss to an owner or provider thereof.

The object is to provide such a device, for use of customers of postal departments, and to provide such a device for use of either banks or post offices for certification of small sums as money paid for certification and payment to the bearer or any person whose name may be inserted by the purchaser.

The principal devices and combinations of devices comprising my invention are as hereinafter described and as defined in the claims. In the accompanying drawings which illustrate my invention like characters refer to like parts throughout the several views.

Referring to the drawings:

Figure 1 is a view chiefly in vertical section on a vertical plane passing through the principal operating shaft of the device, this section being on the line 1—1 of Figures 2 and 3.

Figure 3 is a vertical section at right angles to that of Fig. 1, on the line 3—3 of Fig. 1, and looking to the left from that line or plane. (It will be noted that the lines 2—2 and 3—3 are the same but such line is differently designated for the purposes of the two figures 2 and 3, one viewing rightwardly and the other leftwardly.)

Figure 4 is a detail plan view of a lever of the device.

Figure 5:
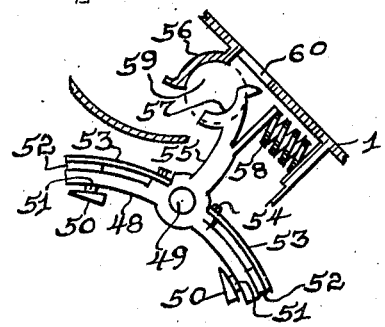

Figure 5 is a detail, on enlarged scale, of the coin receiving and escapement means.

Figure 6:
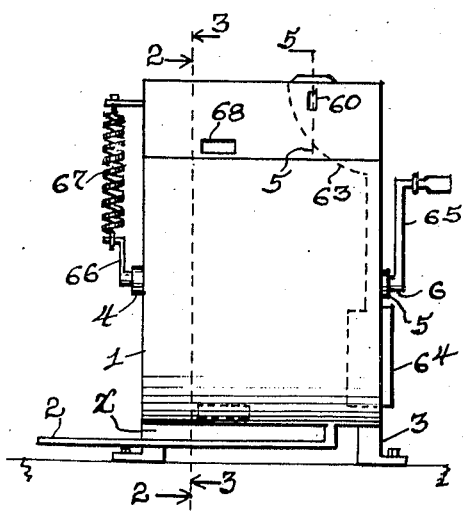

Figure 6 is a frontal elevation on a reduced scale of the device.

Figures 7 and 8, are views, on a much enlarged scale (as compared with the machine) of certifications as would be made by the machine, Figure 7, such as would be for postage paid certification, and Figure 8 such as would be for money order certification by the device.

Referring again to the drawings, the numeral 1 indicates a casing wherein are contained the principal operating elements of my device, and which has attached to or formed therewith on its front and lower part a small table or ledge 2 for the purpose hereinafter described, and which has legs or standards 3 upon which it may rest and by which it may be bolted to any stable element such as a counter or metal permanent stand. The casing 1 and its parts may be made in as many parts as necessary for its assembling.

The casing 1 has approximately midway of its height, bearings 4 and 5 formed in its sides for a rotatable shaft 6 so that the latter is rotatable on an axis parallel to the front side of the casing 1. The shaft 6 itself forms a bearing for an oscillable wheel 7 which has a centrally disposed hub 8 within which the shaft 6 lies and may rotate, the wheel 7 being unmoved by the rotation of shaft 6, except for the oscillatory motion hereinafter described.

The shaft 6 also carries three other elements, but these are secured to or formed integrally with the shaft 6 so that they will rotate with the shaft 6, and these elements or units are, first, a crank arm 9 carrying a roller 10 and constituting therewith an impressor actuating means; second, a crank arm 11 carrying a roller 12 and constituting therewith a portion of a means for resetting the wheel 7 to its initial position in which the printing elements are removed from printing position and the device is ready for another cycle of operation; and third, a ratchet wheel 13 having teeth 14 providing means for locking the shaft 6 and its secured elements (the first and second above) against reverse movement. These three elements, while rotating with and so secured to shaft 6 that their rotatable movement is exactly in unison with that of shaft 6, may be separately made and attached to the shaft 6, so as to facilitate assembling of the device, as indicated, but they are shown as integral for the sake of clarity.

The ratchet wheel 13 has associated therewith, the ratchet lever 15 which is pivotable on a pin 16 secured on the inside wall of casing 1, and has underneath its end removed from wheel 13 a spring 17 whose function is to keep that end of lever 15 raised and accordingly the opposite end 18 of lever 15 depressed, yieldably, on the ratchet face of ratchet wheel 13. Spring 17 is placed between the lever and a shelf 19 fixed on the inner side of a wall of casing 1. By this means shaft 6 is prevented from rotation except in the direction permitted by this ratchet means, and that direction is in the anti-clockwise direction as viewed in Figure 3 and in the clockwise direction as viewed in Figure 2.

The oscillable wheel 7 is an inscription unit and its principal function is to carry three (or any number) of the inscription elements or units A, B, and C.

Each of the inscription units A, B, and C, may be of any form most suitable for bearing the inscriptions required, and in the form illustrated each has a small rectangular cup 20 on the outermost end having inserted therein an inscription element 21 having an inscription on its outer face, that is the exposed face, and each has a shank 22 extending up radially from the cup 20, and on the inner end of the shank 22 a small disk 23. This unit is supported in the wheel 7 so that the cup 20 is yieldably held up in a supporting cup 24 formed in the wheel 7, and a small coil spring 25 lies between the inside end of the supporting cup 24 and the disk 23, the result being that the cup 20 is yieldably held radially inwardly in supporting cup 24 by spring 25 until it is depressed or extended radially as hereinafter described. Each of the three units A, B, and C is similar, except that its inscription is different from each of the others, and each is held in its own supporting cup 24 in the wheel 7. Thus each is yieldably held radially inward in its associated supporting cup 24 by its associated spring 25 until it is individually depressed or extended as hereinafter described.

Within the drum periphery of the wheel 7, there is supported by a pivoting lever 26, an interceptor bar 27, the latter having generally a horizontal position and somewhat curved at its ends, as shown, and being securely fixed to or formed with pivoting lever 26. The lever 26 at its opposite end is pivotable on the pivot 28, the latter being fixed on an inside wall of casing 1. The pivoting lever 26 has approximately midway of its length, an integral ledge 29 between which and a fixed ledge 30 on casing wall 1, there is a small coil spring 31 which serves to yieldably with but slight downward pressure hold pivoting lever 26 downwardly in position, this pressure being so light however that it does not cause compression of any spring 25. The interceptor bar 27 midway of its lower side bears an integral cup 32 in which is a small spring 33 bearing downwardly on an inverted cup 34, the pressure being however insufficient to cause compression of any spring 25.

The cup 34 slides upwardly into cup 32 of interceptor bar 27 so that one is thereby guided by the other. The lower face of cup 34 is or forms a disk 35 which has curved extending projections 36 extending in the direction parallel to direction of interceptor bar 27, which direction is also parallel to the plane passing at right angles to axis of wheel 7. The projections 36 are upwardly curved and serve to permit disks 23 of inscription units A, B, or C, to slide underneath disk 35 and to prevent the latter from dropping beneath a disk 23 when such a disk is approaching it or beneath it.

The combined effect of pressures of the springs 31 and 33 is not sufficient to compress the coil spring 25 so as to move an inscription unit A, B, or C, downwardly in an impressing movement, so that any of these units are not so depressed except in the positive impressing movement hereinafter described. The springs 31 and 33 are not important in the operation except to maintain the adjacent or separated parts in positions for best functioning, and springs 31 and 33 may be eliminated in some constructions without changing the method of operation, since their chief function or only function is to maintain close cooperation of the interceptor bar 27, the disk 35 and the upper disks of units A, B, C, so that they will be in contact but permit take-up of the slack between interceptor bar 27 and the small disks 23 of the units A, B, C, when either of the latter is in position for imprinting. Spring 31 serves chiefly to keep lever 26 and interceptor bar 27 down on top of any unit A, B, or C below it, so that interceptor bar 27 will not in any tilting of the entire device, for instance, move out of position around its pivot pin 28.

The crank arm 11 and its roller 12 are located on the side of wheel 7 opposite to that of crank arm 9, and the roller 12 moves in a plane transversely of shaft 6 which is just rightwardly of wheel 7, as is shown in Fig. 1. There is in cooperative association with the crank arm 11 and its roller 12, in the same transverse plane, a curved lug 37 which normally lies in such a position radially distant from axis of shaft 6, that the roller 12 will catch against it in rotation towards it. The lug 37 is formed integrally with a somewhat curved lever 38 which at its end remote from lug 37 is pivoted on the pin 39 fixed in the edge of a drum 40 formed integrally with wheel 7 on its side toward crank arm 11, the pivoting action being such that lever 38 with lug 37 may be moved radially outwardly. A spring 41 of the leaf type has one end fixed to drum 40 and the other end bears inwardly against the lever 38 to yieldably move it radially inwardly, but this movement is held to a prescribed limit by a stop 42 also fixed on the edge of drum 40 and adapted to be abutted by the oppositely extended short arm 43 of lever 38, so that thereby lug 37 is normally held in the exact position radially from axis of shaft 6 to be caught by roller 12 in the latter's rotational movement.

The lever 38 in a location near the position of catch 37 but displaced to the right in Fig. 1, has fixed to it a small bearing pin 44 upon which is mounted a roller 45. There is associated with roller 45 in the same plane transversely of shaft 6, which is a plane somewhat removed rightwardly (in Fig. 1) from the transverse plane wherein are the lug 37 and roller 12, a curved cam or ledge 46 having an angular end 47, and this curved cam 46 is stationary and fixed permanently to the inside adjacent wall of casing 1. The position of curved ledge 46 is such that when the lug 37 with its lever 38 have as hereinafter described, been moved to return the wheel 7 to its normal position, then roller 45 will, abutting against angular end 47, be moved up on the outer face of curved ledge 46 and thus be carried radially outwardly from axis of shaft 6 and thus also to a like extent carry lever 38 and lug 37 radially outwardly so that this lug 37 is released from the further action of roller 12 and thus roller 12 may in its further rotational movement proceed therein without the movement with it of the lug 37, lever 38, drum 40, wheel 7 and the inscription units A, B, and C, which the wheel 7 carries. This movement is thus limited so that wheel 7 with its inscription units A, B, C, in the reverting or reestablishing movement is carried backwardly only to its normal or so-called initial position, and then released by roller 12, but, there caught or locked by the escapement means hereafter described, until such escapement means is operated when a coin is inserted.

The escapement means above referred to is a coin operated escapement means and this escapement means first performs the function of locking the wheel 7 with its inscription units A, B, and C, in its initial position, where such inscription units cannot perform any impressing function; and secondly performs the function of permitting a stepped movement with each coin insertion so that the inscription units A, B, C, may be successively moved into the impressing zone, but so that only one thereof occupies that zone at once, the unit occupying that zone, depending upon the number of coins which are inserted.

Such escapement means is generally as to the coin insertion or receiving means the same as or somewhat of the same character as such coin receiving means in coin slot machines generally are, and may have any of the protection means usually used with such automatic machines to prevent fraud or use of improper coins or slugs, but any such means other than that shown is not included for the sake of simplicity in the drawings and clarity in the illustration of the functioning of the especial elements which are needed for this inscription means, and its prohibiting means.

The escapement means consists principally of an oscillating locking sector or arm 48 pivoted on pin 49, the latter fixed on the inside side wall of casing 1, and bearing on its opposite ends individual escape teeth 50 each of which is borne by a small shank 51 extending through the adjacent end of arm 48, the shank 51 having a flange 52 on its opposite end against which presses the free end of one of the two leaf springs 53, the other ends of such leaf springs being secured by screws 54 to the central portion of arm 48, as shown in Fig. 5, which is an enlarged side view of the escapement means. The arm 48 has extending from it nearly at a right angled position to arm 48, and fixed thereto, a coin lever 55 which extends to a position nearly opposite one side of a fixed coin slot apron 56, and at that position arm or lever 55 bears a curved coin guide 57, which in conjunction with, and opposed to it serves the function of permitting passage of a coin of a particular form and character and as it is moved to oscillate the arm 48 through one escape movement. The coin lever 55 and with it arm 48 are normally held by spring 58 in a position such that the passage 59 for coin insertion is normally sufficiently less than the diameter of the coin in width, so that passage of the coin will cause the movement necessary to effect the one escape movement. There is placed immediately outside of the coin slot apron 56 a coin slot 60 formed in the metal of the casing 1 or any metal attached thereto, this coin slot 60 having exactly the size in length and width across the slot, which will permit of passage of the coin for which the coin slot is designed to be adapted, and no other coin or slug, larger in diameter or thicker. The teeth 50 are of a form such that they will in the escape movement permit movement in the escape action by steps of the drum 40 with its attached wheel 7, the drum 40 on its outer face having the escape teeth 61 and intermediate cam faces 62, but they are also of such cam form on one side that when the drum 40 is reversely moved in the reverting movement these teeth will permit movement of the cams 62 under them for such movement, and in that reversing movement of drum 40, the escape teeth 50 will or may be permitted by spring leaf springs 53 to rise sufficiently for that purpose. The leaf springs 53 in conjunction with flanges 52 serve also to ensure singly stepped movement of drum 40 and its attached wheel 7, in the coin insertions permitting escapement.

By reference to Figure 5, it will be apparent, that when a coin is inserted in slot 60, the coin will pass between elements 56—57, which normally have a distance or space between them less than the diameter of the coin, and accordingly the element 57 will by the coin insertion, be thrust against tension of spring 58 to raise one end of oscillating arm 48, and lower the opposite end thereof, thereby raising one escape tooth 50 and lowering the other, thereby raising one from engagement with a tooth 61 and lowering the other on cam side 62 of such a tooth, the result being to release the one tooth 61 and catch another tooth 61, as the wheel 7 is turned by the tension of spring 69, the latter becoming effective for turning the moment that the released tooth 61 is so released. The inwardly depressed or moved tooth 50 serves immediately to stop movement of the wheel 7 beyond the prescribed distance determined by the teeth 61.

The escape means described is one form thereof for use with my device, it being noted that any form of such escape means permitting the stepped escape movement may be utilized, in a construction. The coin slot 60 and coin slot apron 56 are located so that an adjacent receiving apron 63 will direct coins as inserted downwardly and sidewisely to the coin receiving chamber 64, the latter shown in Figure 6.

The shaft 6 at one end has fixed thereto the hand crank lever 65 by which it may be turned, in one direction only, and at the opposite end has fixed thereon a crank arm 66 to which one end of a coil spring 67 is attached, the other end thereof being attached to casing 1, in such manner that coil spring 67 operates to pull crank arm 66 and thus shaft 6 through the latter half of its rotation as hereafter described, so that thus completion of a rotation is thus induced by this spring 67, the rotation being however begun and in the major portion at least induced by hand crank lever 65. By the ratchet means described, the shaft 6 is prevented from having any movement except in the one direction only, and that direction is as viewed in Fig. 2, in the clockwise direction, and as viewed in Fig. 3, in the anti-clockwise direction.

As seen in Fig. 6, and also in Fig. 1, the crank arm 66 is pointed vertically upwardly when hand crank 65 is pointed upwardly, and so when each of the latter has passed the vertically lowermost point of its positions in movement, the tension of spring 67 is at its maximum to pull crank arm 66 upwardly, and this becomes effective as soon as the operator has pulled the hand crank 65 past this lowermost position vertically, and spring 67 thereby exerts that tension to continue the turning movement of hand crank 65 and shaft 6 with its elements, notwithstanding the operator may then release his hold and discontinue his exertion on hand crank 65. Thus spring 67 will be effective to return the hand crank 65 and thus shaft 6 to the initial operating positions, when the operator effects the first one half and slightly more of that turning movement of shaft 6, and this he must do in order to finish the imprinting and secure release of the paper or mailing matter he has placed in slot X.

Each of the inscription units A, B, C, has on the underside of its inscription element 21, an inscription, and these inscriptions are of a form and shape and so protruding that they will form a printing element and perform that function. The inscriptions are generally similar in character except that they will imprint varying amounts. If used for a postage payment inscription or impression, A unit for instance may specify $.01, paid, B unit, $.02, paid, and C unit, $.03, paid, and be generally as shown in Figure 7, designating the name of the postal department and country properly. As shown for description in Fig. 7, the inscription may refer to "United Nation" by letters "U. N." Or in postage use this may be U. S., for instance.

If used for money order certification, an inscription such as that in Figure 8 or of a character suitable for such use, may be used, and A unit may certify to $.05, B unit to $.10, C unit to $.15. Or for this use, A unit may certify to $.10, B unit to $.20, C unit to $.30. Or A unit may certify to $.25, B unit to $.50, C unit to $.75. Such amounts may be as determined for use, it being understood that such amounts in one device should be multiples of one type of coin, as pennies, or nickels, or dimes, or quarters, or half dollars.

The table or ledge 2 formed with or secured to the casing 1 is in a position such that it lies just beneath the location of an inscription unit A, B or C when such a one is in an impressing position, and so that if an envelope for instance is placed thereabove in envelope or paper slot X, the corner of the envelope will come in position beneath the impressing unit, and the envelope or paper in the impressing operation will bear downwardly on the ledge 2.

The casing 1 may have a window 68 of glass through which the customer may see what position the wheel 7 with its inscription units is in as he inserts coins, the wheel 7 having on its outer drum face numeral plates or inscriptions M which may have for instance $.01, $.02, $.03, on them respectively. But these inscriptions may be omitted and window 68 also omitted if desired.

The inscribing or impressing zone may be otherwise called an imprinting zone and the inscribing or impressing movement may be otherwise called an imprinting movement.

Having described the apparatus its method of use or operation, is now related so that its sequence of operation, and the steps in such sequence may be understood. The device is by bolts bolted to any stand or counter as mentioned, and preferably in a convenient location in any store, for instance, or hotel lobby, or in a post-office public lobby, so the public may use this device, if used as a postal paid device, or it may be in a bank lobby, or a department store for instance if for a money order use.

Suppose the customer desires a postage paid inscription and the particular machine is designed for this use, he first places the envelope or card on which he desires an inscription or certification, in paper slot X or holds it there with one hand. Or he may first insert his coins to select the proper inscription and pay therefor. To select and pay for his desired inscription, he places coins one at a time in the coin slot 60. If he desires a one cent certification he places one cent in. If a two cent certification, he places two cents in, in succession, if a three cent certification, he places three cents in, in succession. Each insertion moves coin lever 55 and thus also arm 48 through one complete oscillation, so that drum 40 and wheel 7 is permitted to move one step, through the pull of the coil spring 69 attached to arm 70 of wheel 7 and at the opposite end to rigid arm 71 on inside wall of casing 1.

Figure 2:
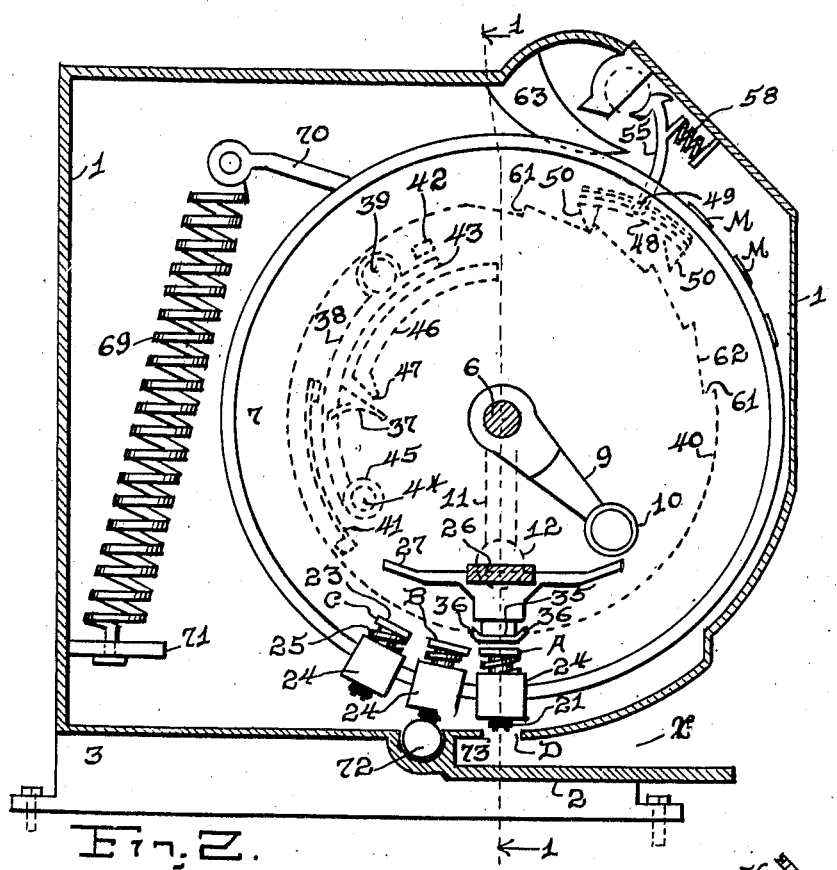
Figure 2 is a vertical section at right angles to that of Fig. 1 on the line 2—2 of Fig. 1 and looking to the right from that line.

The movement by steps thus permitted is induced by spring 69 and is a movement of wheel 7 in anti-clockwise direction as viewed in Fig. 2, and in clockwise direction as viewed from right of Fig. 1. Thus this stepped movement will with one coin insertion permit wheel 7 to move so that inscription unit A is in the position shown in Fig. 2, which is the first imprinting position, as shown, in Fig. 2, one movement or step having been accomplished. Two coins will permit movement so unit B will be in that position, three coins will permit such movement that unit C will be in that position. It should be noted here that in movement of wheel 7 the inscription elements 21 move over an ink roller 72, diagrammatically shown only. Any other inking means may be used, or the inscription elements 21 may be self inking, by any means known for that purpose.

Only one step is permitted for each coin insertion. Having selected the certification desired by one, two or three coins, the user, then sees to it that the paper or envelope for imprinting is in position in paper slot X, and he then grasps hand crank lever 65 and pulls it toward him, as he views the machine in Fig. 6, facing it, and gives it one complete revolution. This one revolution of lever 65 and shaft 6 will produce the following sequence of movements: Assume first unit A is in position shown in Fig. 2, one coin having been inserted, as hand lever 65 is revolved, crank arms 9 and 11 are uniformly revolved with shaft 6 and hand lever 65, as is also ratchet wheel 13, and so moving, first, crank arm 9 by its roller 10 moves on interceptor bar 27 and thereby depresses interceptor bar 27 and with it the inscription unit A, this being in the impressing position, and coil spring 25 is compressed as necessary for this accomplishment, and this depression of unit A results in impression of the inscription element 21 with its inscription on the upper face of the envelope or paper in slot X, and thus the certification is made once, and once only, and as crank arm 9 moves away from interceptor bar 27 and unit A rises again, the crank arm 11 carries roller 12 then in progression of the sequence, against catch 37 and thereby carries lever 38 with drum 40 and wheel 7 with it in rotation for a distance, until roller 45 abuts against angular end 47 and rises on ledge cam 46 and thus releases or pulls lever 38 with catch 37 from roller 12, so that roller 12 and wheel 7 are then freed from each other, and roller 12 and shaft 6 may continue to complete the revolution until hand crank lever 65 is again in the upper position shown. This has resulted in moving wheel 7 in the reverting movement, that is to return it to normal position, which is one step back of position shown in Fig. 2, that is with all the units A, B, C, moved back away from the opening or slot D through which element 21 may move in the depressing movement. Thus all units are back of or behind ledge 73 and unit A with its element 21 is over or on the ink roller 72. In this movement when wheel 7 has been so moved backwardly to the normal position where unit A is over ink roller 72, the catch 37 is as described released, and the last escape tooth 61 in drum 40 is caught by the escape locking means, described, and wheel 7 is then held in that position until further coin insertions are made.

It will be observed that in the rotation of shaft 6 by lever 65, at no time is shaft 6 permitted to reverse its movement and thus at no time can the customer or user duplicate the impression or imprinting movement, and hand lever 65 and shaft 6 with wheel 7 and its units A, B, C, must be returned to the original starting position, where all units A, B, C, are back in normal position where no imprinting can be accomplished, and also the wheel 7 is in position to be stepped by coin insertions, into positions for A, B, or C impressions.

It should be especially noted that the single way rotation of shaft 6, ensured by the ratchet means, in conjunction with the reversing movement of wheel 7 with its inscription units accomplishes the function of locking the device against repetitions or duplications of the certification, without new coin insertions for selection of the imprinting unit desired. Thus the device is locked or protected against loss through thieving or error.

Suppose that the device is designed for money order or certificate use, as for postal money orders or bank money orders of small denomination, which are so much desired for various uses, and yet inconveniently obtained and at cost disproportionate sometimes to the amounts desired for remittance, then the inscriptions would be somewhat as shown in Figure 8, but may be of any character found suitable, to evidence payment and inscribe a certificate. For this purpose, there may be used any particular type of blank or partially imprinted certificate furnished for use with the device. And in conjunction any additional imprinting means, as for imprinting name of payee and remittor may be used therewith, and the use may be in any manner and form determined as desirable by bankers or any postal department desiring the device for such use. For such use the certificates issued may for instance provide for payment to the payee of a sum say two or three cents less than the amount thereof, if of the larger amounts, or if of lesser amounts need not provide for any cost of the service.

While I have shown particular devices and combinations of devices in the illustration of my device, I contemplate that other detailed devices and combinations of devices may be utilized in the realization thereof, as for instance electric operating means may be used therefor instead of manual means, for operation of the devices without departing thereby from the spirit and contemplation of the invention.

What I claim is:

1. In a coin controlled printing means, a series of stamping elements, a motor means to move elements of the stamping means successively and singly into an imprinting position, an escapement means permitting said movement of stamping elements successively and singly into the imprinting position and away therefrom, an actuation means for imprinting operation of an element in the imprinting position, a coin receiving means adapted by successive coin insertions for stepped operation of the escapement means to effect a single step of said progressive movement for each coin insertion, and manually moved means for effecting the actuation of the actuation means to procure the imprinting operation.

2. In a coin controlled printing means, a series of stamping elements, a motor means to move elements of the stamping means successively and singly into an imprinting position, an escapement means permitting said movement of stamping elements successively and singly into the imprinting position and away therefrom, an actuation means for imprinting operation of an element in the imprinting position, a coin receiving means adapted by successive coin insertions for stepped operation of the escapement means to effect a single step of said progressive movement for each coin insertion, and manually moved means for effecting the actuation of the actuation means to procure the imprinting operation, and in combination the said actuation means including means for reestablishing non-imprinting positions of the stamping elements and the said actuation means having in association means for precluding repetition of the imprinting operation of any stamping element until renewed coin insertion.

3. In a coin controlled printing means, a series of stamping elements, an actuating means for inducing an imprinting operation, a carrier for said stamping elements arranged for placing said stamping elements successively and singly in position for the imprinting operation, a motor means to move said carrier for said placing, a coin receiving means having interconnected control means for said carrier and adapted by successive coin insertions to determine the placing by said carrier of said stamping elements individually and singly in the imprinting position in accordance with progressive insertions of coins, and manually moved means for effecting the operation of the actuating means, and in combination the said actuating means including means for reestablishing non-imprinting positions of the stamping elements and the said actuating means having in association means for precluding repetition of the imprinting operation by any stamping element until renewed coin insertion in the coin receiving means.

4. In a coin controlled printing means, a carrier having a multiple number of stamping elements supported thereby, a motor means to move said carrier to place said stamping elements successively and singly in an imprinting position, an actuator for moving a stamping element transversely of the carrier for imprinting, a coin receiving means and a carrier control means associated therewith for permitting movement of the carrier by successive coin insertions to successively place the stamping elements individually and singly in the imprinting position, the said actuator including means reestablishing the non-imprinting position of the carrier after an imprinting movement of a stamping element, and a manual control means for effecting movement of the actuator.

5. In an apparatus of the character described, the combination of a multiple number of stamp imprinting devices arranged successively in a carrier, a motor means to move said carrier to place said stamping elements successively and singly in an imprinting position, an operating means for moving any one of said devices transversely of said carrier when such a one of said devices is in the imprinting position, and a locking means normally locking said carrier with said devices in a non-imprinting position, a coin receiving means interconnected with said locking means to effect unlocking of said locking means for movement of said carrier in one step of its movement with each coin insertion for said successive placing of said elements in the imprinting position.

6. In a coin controlled printing means, a carrier having a multiple number of stamping elements supported thereby and adaptable to be moved by the carrier into imprinting position successively and singly, a motor means to move said carrier for said placing of said elements, an actuator for moving a stamping element in the imprinting position in the imprinting movement, a coin receiving means, a carrier control means associated with the coin receiving means and adapted with each coin insertion to permit said progressive movement of the stamping elements to the imprinting position, and a means included with said actuator in actuation relation therewith to restore said carrier with said elements to the non-imprinting position after an imprinting movement.

7. In an apparatus of the character described, the combination of a multiple number of stamp imprinting devices arranged successively in a carrier the said carrier being movable across an imprinting position wherein matter for imprinting may be included, an imprinting actuating means in cooperation with said imprinting position and adapted to move any of said devices when in said imprinting position transversely of said carrier for the imprinting movement, a motor means for moving said carrier to place each of said devices successively in said imprinting position, a coin controlled locking means interconnected with said carrier to normally lock said carrier with said devices against movement and unlocking said carrier for successive movements by said motor means with each coin insertion for placement of said devices successively and singly in said imprinting position.

8. In a device of the character described, a base against which matter for imprinting is supported, a multiple number of inscription imprinting devices and a movable mounting therefor wherein each said device is mounted to be movable transversely of said base for an imprinting movement, a motor means to move said movable mounting with said devices to place said devices successively and singly in an imprinting position, a rotatable element having a single actuation revolution and in association therewith means impelling said imprinting movement of a device in said imprinting position in part of said revolution and means forcing said movable mounting with said devices out of said imprinting position in a succeeding part of said revolution, and locking means in association with said rotatable element to bar reversal of movement thereof while permitting the rotary movement in one direction for a complete revolution.

9. In a device of the character described, a base against which matter for imprinting is supported, an inscription imprinting device and a movable carrier therefor wherein said device is mounted to be movable transversely of said base for the imprinting movement, a means normally retaining said carrier with said device in a non-imprinting position, and unlocking means associated with coin receiving means to unlock said device from said non-imprinting position on insertion of a coin, an actuating element having means for accomplishing in one cycle of movement in succession, first the said transverse imprinting movement of said device, and second the restoration of said carrier with said device to said non-imprinting position.

10. In a device of the character described, a base against which matter for imprinting is supported, an inscription imprinting device and a movable carrier therefor wherein said device is mounted to be movable transversely of said base for the imprinting movement, a means normally retaining said carrier with said device in a non-imprinting position and unlocking means associated with coin receiving means to unlock said device from said non-imprinting position on insertion of a coin, a rotatable element having means for accomplishing in one revolution in succession, first the said transverse imprinting movement of said device, and second the restoration of said carrier with said device to said non-imprinting position, and in combination a locking means for said rotatable element to permit movement in one direction for said two accomplishments while barring a reversal of said movement.

11. In a device of the character described, a base against which matter for imprinting is supported, an inscription imprinting device and a movable mounting therefor wherein said device is mounted to be movable transversely of said base for the imprinting movement, a means normally retaining said movable mounting with said device in a non-imprinting position and unlocking means associated with coin receiving means to unlock said device from said non-imprinting position on insertion of a coin, a rotatable element having a single actuation revolution and in association therewith means impelling said imprinting movement in part of said revolution and means forcing said movable mounting with said device out of said imprinting zone to said non-imprinting position in a succeeding part of said revolution, and locking means in association with said rotatable element to bar reversal of movement thereof while permitting the rotary movement in one direction for a complete revolution.

12. An imprinting means including a movable carrier having inscription elements for imprinting numerical amounts in one basic amount and multiples thereof, a motor means to move said carrier to place said inscription elements successively and singly in an imprinting position, a locking means therefor normally retaining said carrier with said elements in a non-printing position and interconnected with said movable carrier to permit the movement thereof successively to place each of said inscription elements successively in said imprinting position, coin receiving means interconnected with said locking means to receive coins and to unlock said movable carrier for the movement of said carrier with said elements progressively one step for each coin received, an actuation means to impart imprinting movement to an inscription element placed in said imprinting position.

13. An imprinting means including a movable carrier having inscription elements for imprinting numerical amounts in one basic amount and multiples thereof, a motor means to move said carrier to place said inscription elements successively and singly in an imprinting position, a locking means therefor normally retaining said carrier with said elements in a non-printing position and interconnected with said movable carrier to permit the movement thereof to place each of said inscription elements successively in said imprinting position, coin receiving means interconnected with said locking means to receive coins and to unlock said movable carrier for the movement of said carrier with said elements progressively one step for each coin received, an actuation means to impart imprinting movement to an inscription element placed in said imprinting position and means in association with said actuation means to restore said carrier with said elements to said non-printing position after said imprinting movement.

14. An imprinting means including a movable carrier having inscription elements for imprinting numerical amounts in one basic amount and multiples thereof, a motor means to move said carrier to place said inscription elements successively and singly in an imprinting position, a locking means therefor normally retaining said carrier with said elements in a non-printing position and interconnected with said movable carrier to permit the movement thereof to place each of said inscription elements successively in said imprinting position, coin receiving means interconnected with said locking means to receive coins and to unlock said movable carrier for the movement of said carrier with said elements progressively one step for each coin received, an actuation means to impart imprinting movement to an inscription element placed in said imprinting position, means in association with said actuation means to restore said carrier with said elements to said non-printing position after said imprinting movement, and locking means in association with said actuation means to bar reversal of movement thereof during the actuation movement thereof.

ADOLPHE C. PETERSON.